ÅKE JERNQVIST
BENGT HEDSTRÖM
ATTORNEYS

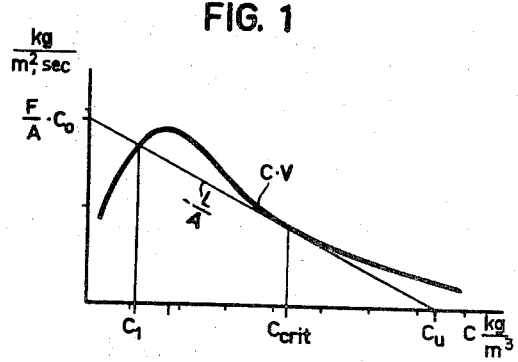
FIG. 1
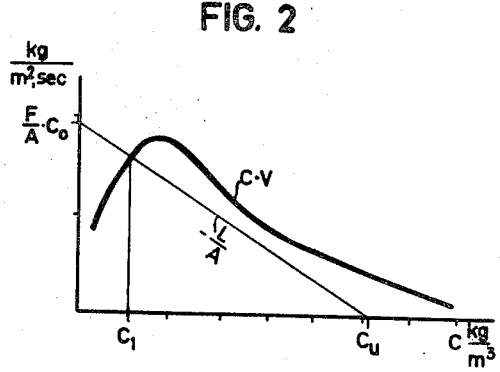
FIG. 2
FIG. 3
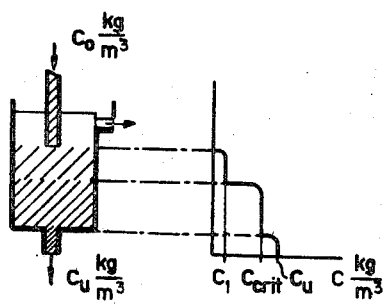

United States Patent Office 3,551,330
Patented Dec. 29, 1970

3,551,330
METHOD OF OPTIMUM OPERATING A SEDIMEN-TATION APPARATUS AND A DEVICE FOR CARRYING OUT THE METHOD
Åke Jernqvist and Bengt Hedström, Goteborg, Sweden, assignors to Rederiaktiebolaget Nordstjernan, Nynashamn, a Swedish joint-stock company
Filed July 1, 1968, Ser. No. 741,483
Claims priority, application Sweden, June 30, 1967, 10,073/67
Int. Cl. B01d 21/00, 35/20
U.S. Cl. 210—19
11 Claims

ABSTRACT OF THE DISCLOSURE

Apparatus for separating sediment from liquid at an optimum rate includes a feed, an underflow for the sediment, and an overflow for the clear liquid. The feed rate and/or the underflow rate is adjusted so that a discontinuity in the vertical concentration of the sediment appears at a level between the feed and the underflow. A sensor and control automatically maintain the discontinuity at that level, thereby assuring that the apparatus operates at capacity.

BACKGROUND OF THE INVENTION

Conventional sedimentation apparatus intended for treating relatively concentrated suspensions produces at overloading concentrations a solution in the overflow which is not clear. That is, some of the particles exit by way of the overflow and are not separated from the liquid. Below maximum load, it is true, the overflow is entirely clear, but the underflow shows a concentration lower than necessary. That is, more liquid than necessary remains associated with the particles that exit by way of the underflow.

The load of a sedimentation apparatus is defined as the amount of feed multiplied by the concentration of solid particles of the feed.

Exactly at maximum load the concentration in the underflow is as high as possible and at the same time the overflow is clear.

In view of the risk of obtaining solid particles in the overflow, which is highly objectionable, in practical operation, particularly in the operation of baffle sedimentation apparatus, it is necessary to work below the maximum load.

SUMMARY OF THE INVENTION

If it were possible to find a physical magnitude, which at an early stage (before there arises the risk of a turbid overflow) is adapted to indicate when the maximum load is at the point of being exceeded, this magnitude could be utilized for control purposes, so that the sedimentation apparatus continuously can operate at maximum load, which in its turn would render possible the optimum economic utilization of the sedimentation surface available.

Thorough theoretical analysis as well as practical measuring results show that there exists such a physical magnitude, which is well adapted for control purposes. At suitable operation conditions, namely, there arises a horizontal sharp interface or discontinuity in the vertical concentration distribution. This discontinuity level at constant load can be located at any place between the feed inlet and bottom outlet without causing a change in the concentration of the underflow.

Below the discontinuity the concentration is high and increases in baffle sedimentation apparatus towards the bottom, but is constant in vertical thickeners, while the concentration above the discontinuity is low and constant. This implies that for baffle sedimentation apparatus the concentration discontinuity is more marked (and easier to measure) the lower it is located. At a stationary overload or underload condition there is no concentration discontinuity. At optimum (maximum) capacity the discontinuity level lies still. If at constant conditions the load increases, the discontinuity level rises, and it falls when the load decreases. At the top and bottom, respectively, of the apparatus the discontinuity gradually disappears entirely. This is the reason why the discontinuity here discussed normally cannot be observed in a sedimentation plant.

Consequently it is possible via suitable load changes to place the discontinuity level at any place between the feed inlet and bottom outlet. This is also possible via changes in the underflow at constant conditions in general. By mounting two pressure-sensitive members with small vertical spaced relationship on both sides of the position of the discontinuity it is possible to determine said position and by control of an underflow pump to maintain it between said two pressure-sensitive members, thereby utilizing at optimum the sedimentation surface available. The two pressure-sensitive members are to measure the highly very small change in the pressure difference which arises as soon as said discontinuity level is changed. The control can be made manually or automatically, for example by a servomotor controlled by the impulses from the pressure-sensitive members. When at constant load the underflow increases, the underflow concentration will decrease, and vice versa. The control, thus, implies that the highest possible underflow concentration is maintained in respect of the load in question, the load thereby being at optimum (maximum) at the operation conditions in question.

An embodiment of the invention, thus, comprises the mounting of pressure-sensitive members on both sides of the desired position of the discontinuity level. The underflow pump is controlled by the impulses from the pressure-sensitive members. When the pressure difference increases (the discontinuity level rises), the underflow is made to increase in a compensating way in accordance with the invention. The invention provides a possibility of maximum utilization of the sedimentation apparatus at relatively high discharge concentrations. The essential feature of this invented system and of the apparatus designed for realizing the system is, that at every occurring operational condition of the plant maximum load automatically can be maintained continuously. This system has been rendered possible by thorough theoretical and experimental analysis of the settling properties and conveying properties of slurry, of the balance conditions of the material web and of the non-stationary properties of baffle sedimentation apparatus as well as vertical thickeners.

By the invention, thus, it is possible to reduce the consequences caused by operational troubles in the form of variations in the feed amount, in the contents of suspended substance in the feed, and in the settling properties of the suspension.

According to a further development of the invention it is possible at optimum operation of a sedimentation apparatus to utilize the favorable effect of the vibrations on the settling properties of any slurry in the area with higher particle concentration. By such a method, namely, the particle concentration below the controlling horizontal discontinuity can increase, which promotes the control function. In addition, a higher concentration of particles in the outgoing slurry is obtained. The vibrations hereby can be fed directly to the flux or to the casing of the sedimentation apparatus.

The characterizing features of the method and device for optimum operation of the sedimentation apparatus become evident from the claims.

BRIEF DESCRIPTION OF THE DRAWING

The invention is described in greater detail in the following, with reference to the accompanying drawings whereon FIGS. 1 and 2 show curves on the flux of solid particles per surface unit as a function of the concentration of solid particles, FIG. 3 shows in a schematic way a thickener with a different concentration distribution of the flux in the thickener.

DESCRIPTION OF THE PREFERRED EMBODIMENTS

The curves shown in FIGS. 1 and 2 indicate for a suspension concerned the flux of solid particles per surface area, $$c \cdot v \frac{\text{kg.}}{\text{m}^2, \text{sec.}}$$

as a function of the concentration of solid particles, $$c \frac{\text{kg.}}{\text{m}^3}.$$

The curves can be drawn from batch settling tests in a simple graphic way. How this is made and the theoretical analysis thereof is of no interest in this connection.

The essential feature of the invention is that at maximum load of the sedimentation apparatus, i.e. when the greatest possible concentration of particles in the outgoing slurry is obtained without particles following with the discharge flow for the clean liquid, a discontinuity in the vertical concentration distribution of the flux in the sedimentation apparatus has been observed. This discontinuity disappears at overload of the sedimentation apparatus, i.e. when particles follow with the discharge flow for the clean liquid, and at underload of the sedimentation apparatus, i.e. when the outgoing slurry has a lower concentration of solid particles than would have been necessary in view of the absence of particles in the outgoing clear solution.

FIG. 1 shows the concentration distribution at maximum load. Of the different particle concentrations indicated, $C_o$ is the concentration of solid particles at the inlet which may be expressed in any suitable units such as kg./m.$^3$, $C_1$ is the concentration of solid particles below the inlet and above the discontinuity, $C_u$ is the underflow concentration of solid particles, and $C_{crit}$ is the concentration of solid particles below the discontinuity. F designates the feed which may be expressed in any suitable units such as m.$^3$/sec., L the underflow (same units) and $v$ the settling rate (m./sec.). As appears from FIG. 1, the line $L/A$ is a tangent to the curve $c \cdot v$ at maximum load, A being the bottom area in m.$^2$. In FIG. 2 the conditions at an underload of the sedimentation apparatus are shown.

FIG. 3 illustrates in a schematic way a thickener operating at maximum load, and shows also the concentration distribution of the flux in the thickener. As appears from FIG. 3, the discontinuity level is located between the inlet and the bottom outlet. When the thickener operates at maximum capacity, said discontinuity lies still. Upon overloading the thickener either by increasing feed amount or by increasing concentration of solid particles of the feed or by decreasing amount of outgoing slurry, said discontinuity rises in the thickener. When instead the thickener is subjected to underload, either by decreasing feed amount or by decreasing concentration of solid particles in the feed or by increasing amount of outgoing slurry, said discontinuity in the thickener falls.

Figure 4:
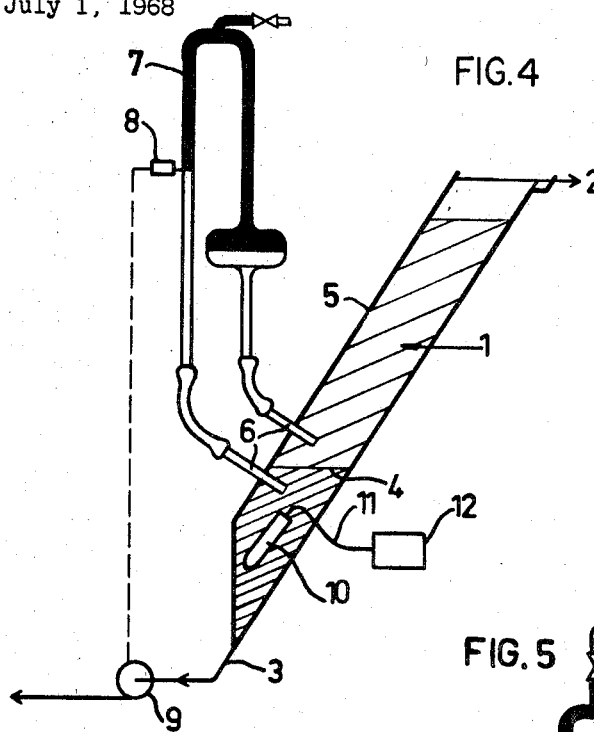
FIGS. 4 and 5 show a pressure gauge connected to a baffle sedimentation apparatus and a thickener, respectively, details corresponding to each other in said last-mentioned figures having been given the same designations.
Figure 5:
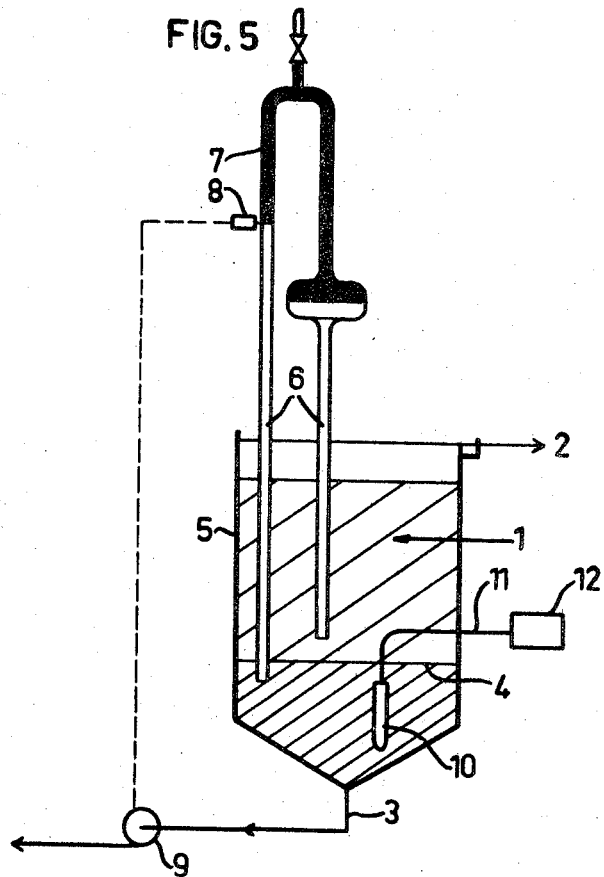

By utilizing according to the invention at separation processes the discovered knowledge on the discontinuity level at maximum load, it has become possible to control the separation processes for optimum operation of a sedimentation apparatus. FIGS. 4 and 5 show examples hereof, with a pressure gauge being connected to a baffle sedimentation apparatus and a vertical thickener, respectively. Details corresponding to each other in the two figures have been given the same designations. FIG. 4 shows a so-called baffle sedimentation apparatus, i.e., an apparatus comprising at least one but preferably several sedimentation units separated from each other by inclined baffles or guide plates on which the sedimentary phase deposits and is in the form of a layer on the baffles transported downwards under a layer of clear liquid. In FIG. 4 only one such unit is shown. FIG. 5, as indicated above, shows a vertical thickener or concentrator.

1 designates the feed, 2 the overflow, 3 the underflow, and 4 the position of the discontinuity level. The sedimentation apparatus proper is designated by 5 and two pipes inserted therein are designated by 6. Particles possibly found in these pipes settle, so that the pipes will contain only liquid. The pipes are connected to a U-pipe 7 turned upside down, the upper part of which is filled with oil having a density slightly below that of the liquid. In this way measurement is made of the difference between the two pipe mouth levels at operation conditions and the corresponding pressure difference if the sedimentation apparatus were filled only with water. This pressure difference normally being extremely small, the oil in the U-pipe and the enlarged area in the right-hand leg serve to increase the deflection in the left-hand leg. The deflection is indicated by the position of the oil-liquid interface. The position is controlled by the photoelectric cell 8, which switches on and off the underflow pump 9. At increasing pressure difference the interface in the left-hand U-pipe leg rises and the photoelectric cell starts the underflow pump, and vice versa. In this way the position of a concentration discontinuity always can be held between the two pipe mouths, because the discontinuity rises when the underflow pump is switch off, and it falls when the pump is switched on. The position of the border face in the left-hand U-pipe leg, of course, can control the underflow pump in another suitable way, and it can also be used for manual control.

It is, as a matter of fact, not the type of the discontinuity sensitive member which is decisive for the utilization of the invention. The essential and novel feature is the principle, by knowledge of the existence of said discontinuity at a maximum utilization of a sedimentation apparatus to control the operation of the same.

FIGS. 4 and 5 also show a vibrator 10, which is mounted in the flux below the discontinuity level 4 and via a duct 11 communicates with a vibration source 12. Instead of immersing vibrator in the flux, it may be arranged at the casing of the sedimentation apparatus. By the vibration in amplification of the concentration discontinuity can be obtained which promotes the control function and can increase the settling effect.

What we claim is:

1. A method of optimum operation of a sedimentation apparatus having a feed and an underflow, comprising the steps of determining the position of a horizontal discontinuity level in the vertical concentration distribution of the settling flux, which level is found in the sedimentation apparatus when the apparatus is utilized at optimum, holding said discontinuity level within a pre-determined area by controlling at least one of said underflow and feed.

2. A method according to claim 1, comprising the steps of measuring the pressure difference at two vertically-spaced-apart points in said apparatus and adjusting said discontinuity level as a function of said pressure difference to maintain said discontinuity level between said points.

3. A method according to claim 1, comprising the steps of optically measuring the position of said discontinuity level and adjusting the position of said discontinuity level as a function of such optical measurement to maintain said discontinuity level at a desired position.

4. A method according to claim 1, comprising the step of supplying vibrations directly to the settling flux.

5. A method according to claim 1, comprising the step of supplying vibrations to the casing of the sedimentation apparatus.

6. Apparatus for separating sediment from liquid at an optimum rate, comprising a feed, an underflow, a differential pressure gauge, said gauge being connected to said sedimentation apparatus for determination of the position of a horizontal discontinuity level in the vertical concentration distribution found in the apparatus at optimum utilization thereof and being provided with a member for sensing the pressure difference between opposite sides of the discontinuity level.

7. Apparatus according to claim 6, characterized in that the differential pressure gauge with said member comprises a U-pipe turned upside down, the legs of said pipe opening into said apparatus on opposite sides of said discontinuity level.

8. Apparatus according to claim 7, characterized in that the U-pipe at least partially is filled with oil, one of the legs being provided with a widening for increasing the deflection in the other leg.

9. Apparatus according to claim 8, characterized by a member for converting said deflection into an electric voltage for automatic control of at least one of said underflow and feed, for maintaining the discontinuity level between the measuring levels.

10. A method according to claim 1, wherein the sedimentation takes place on at least one inclined guide surface under a layer of clear liquid.

11. Apparatus for separating sediment from liquid at an optimum rate, comprising a feed, an underflow, sensing means for determining the level of the discontinuity in the vertical concentration of said sediment, and control means responsive to said sensing means for maintaining said discontinuity within a prescribed range.

References Cited

UNITED STATES PATENTS

| | | | |
|---|---|---|---|
| 129,948 | 7/1872 | Hall | 73—299X |
| 2,984,360 | 5/1961 | Smith | 210—115X |
| 3,082,991 | 3/1963 | Watkins | 137—172X |
| 3,124,528 | 3/1964 | Wood | 210—19 |
| 3,200,971 | 8/1965 | Trethewey | 137—403X |
| 3,375,928 | 4/1968 | Chase | 210—83 |
| 3,443,692 | 4/1969 | Halsey | 210—97 |

SAMIH N. ZAHARNA, Primary Examiner

U.S. Cl. X.R.

210—83, 86, 112